United States Patent
Alessio et al.

(10) Patent No.: US 12,290,034 B2
(45) Date of Patent: May 6, 2025

(54) SYSTEM FOR CULTIVATING PLANTS USING CULTIVATION SHELVES HAVING A COMMON LIQUID COLLECTION BASIN AND SUCTION DUCT, AND OPERATION METHOD THEREOF

(71) Applicant: ZERO SRL, Pordenone (IT)

(72) Inventors: Andrea Alessio, Pordenone (IT); Daniele Modesto, Pordenone (IT)

(73) Assignee: ZERO SRL, Pordenone (IT)

( * ) Notice: Subject to any disclaimer, the term of this patent is extended or adjusted under 35 U.S.C. 154(b) by 248 days.

(21) Appl. No.: 17/619,349

(22) PCT Filed: Jun. 19, 2020

(86) PCT No.: PCT/IB2020/055798
§ 371 (c)(1),
(2) Date: Dec. 15, 2021

(87) PCT Pub. No.: WO2020/255074
PCT Pub. Date: Dec. 24, 2020

(65) Prior Publication Data
US 2022/0232787 A1  Jul. 28, 2022

(30) Foreign Application Priority Data
Jun. 20, 2019  (IT) .......... 102019000009603

(51) Int. Cl.
*A01G 31/06* (2006.01)
*A01G 9/02* (2018.01)
(Continued)

(52) U.S. Cl.
CPC ............. *A01G 31/06* (2013.01); *A01G 9/023* (2013.01); *A01G 27/006* (2013.01); *A01G 31/065* (2025.01)

(58) Field of Classification Search
CPC .................... A01G 31/06; A01G 2031/006
See application file for complete search history.

(56) References Cited

U.S. PATENT DOCUMENTS

| | | | | |
|---|---|---|---|---|
| 6,219,966 | B1 * | 4/2001 | Lapointe | A01G 31/02 47/62 C |
| 8,234,812 | B1 * | 8/2012 | Colless | A01G 31/06 47/61 |

(Continued)

FOREIGN PATENT DOCUMENTS

| | | | | |
|---|---|---|---|---|
| CA | 2523161 A1 * | 5/2006 | | A01G 31/02 |
| CA | 3078662 A1 * | 4/2019 | | A01C 21/00 |

(Continued)

OTHER PUBLICATIONS

International Search Report and Written Opinion of the International Searching Authority, dated Oct. 22, 2020, in connection with International Application No. PCT/IB2020/055798 (14 pages).

*Primary Examiner* — Brady W Frazier
*Assistant Examiner* — Katherine Anne Kloecker
(74) *Attorney, Agent, or Firm* — KLINTWORTH & ROZENBLAT IP LLP

(57) ABSTRACT

A system for cultivating plants comprising a plurality of cultivation shelves for cultivating plants, support frames structured to support the cultivation shelves so as to form one or more horizontal cultivation planes that develop along a first horizontal direction, an aeroponic feeding system, which is provided with nebulizing devices that are arranged at the cultivation shelves for spraying the liquid towards the cultivation shelves themselves, and a suction duct arranged at the nebulizing devices to suck up the nebulised liquid dispersed by the same.

18 Claims, 6 Drawing Sheets

(51) Int. Cl.
    *A01G 27/00*     (2006.01)
    *A01G 31/00*     (2018.01)
    *A01G 31/02*     (2006.01)

(56) References Cited

U.S. PATENT DOCUMENTS

| | | | |
|---|---|---|---|
| 9,345,207 B2* | 5/2016 | Juncal | A01G 31/06 |
| 10,390,503 B2* | 8/2019 | Dufresne | A01G 31/042 |
| 10,492,387 B1* | 12/2019 | Davison | A01G 31/02 |
| 10,973,186 B2* | 4/2021 | Blackburn | A01G 9/029 |
| 11,172,624 B2* | 11/2021 | Lysaa | A01G 27/005 |
| 2018/0338430 A1 | 11/2018 | Cobzev et al. | |
| 2019/0335691 A1* | 11/2019 | Krakover | A01G 31/06 |
| 2023/0000027 A1* | 1/2023 | Schaefer | A01G 22/60 |

FOREIGN PATENT DOCUMENTS

| | | | | |
|---|---|---|---|---|
| CN | 107197769 A | * | 9/2017 | |
| CN | 206686836 | | 12/2017 | |
| CN | 108029545 A | * | 5/2018 | |
| CN | 109699488 | | 5/2019 | |
| CN | 109156331 B | * | 11/2020 | A01G 31/06 |

\* cited by examiner

SYSTEM FOR CULTIVATING PLANTS USING CULTIVATION SHELVES HAVING A COMMON LIQUID COLLECTION BASIN AND SUCTION DUCT, AND OPERATION METHOD THEREOF

CROSS-REFERENCE TO RELATED APPLICATIONS

This patent application claims priority from Italian patent application no. 102019000009603 filed on 20 Jun. 2019, the entire disclosure of which is incorporated herein by reference.

TECHNICAL FIELD

The present invention relates to a cultivation system for plants.

In particular, the invention concerns the recovery of the liquid preferably based on fertiliser that, during the aeroponic feeding procedure, is sprayed towards the plants in a cultivation system preferably, but not necessarily, of the vertical farm type, to which the following discussion will make explicit reference without any loss of generality thereby.

BACKGROUND ART

As is well known, vertical-farm cultivation systems are structured to implement high-density cultivation processes for plants, such as plants/vegetables, in closed artificial environments generally free of soil/earth and sunlight. The plants are cultivated in dedicated shelves or trays mounted horizontally on support frames and are distributed on several cultivation planes overlapped at progressively increasing heights in relation to the support surface for the frames so as to extend the system, including in the vertical direction.

The plant cultivation processes carried out through the above-mentioned cultivation systems essentially involve feeding a fertiliser-based liquid into the cultivation planes in a controlled manner and, at the same time, lighting them using artificial light sources.

In some cultivation systems of the type described above, the liquid is fed to the plants by aeroponics. The aeroponic feeding essentially involves spraying/nebulising the fertiliser liquid towards the cultivation tray so as to wet the plants' roots.

Since during spraying, part of the sprayed fertiliser liquid is dispersed, i.e. it falls downwards, collection systems are generally provided in cultivation systems.

Some collection systems require the use of a hydraulic discharge system comprising collection tanks that are arranged below the cultivation planes and are provided with discharge openings on the bottom that are connected, in turn, to vertical discharge columns through external connections. The discharge system also comprises common liquid recovery containers that are arranged below the first cultivation plane and are hydraulically connected to the discharge columns to receive and store the liquid that flows out of the tanks. In use, the liquid contained in the tanks drains, by gravity, through the discharge openings towards the discharge columns that always convey it by gravity to the tanks below.

A first technical problem with the hydraulic discharge system described above is that it is particularly susceptible to clogging both at the discharge openings and in the connections. In addition to the cost of intervention, clogging can cause stagnation in the cultivation planes and, thus, increase the risk of fungal and bacterial formation and contamination of the plants.

A second technical problem with the hydraulic discharge system described above is that, in order to ensure correct discharge of the liquid, the tanks must be provided with a significant number of both discharge openings and vertical columns, conditions that affect both the overall size of the system and the cost of its implementation.

A third technical problem with the hydraulic discharge system described above is that the common collection tanks occupy a useful space that could potentially be occupied by the first cultivation plane, which is therefore attached at a predetermined minimum height that is greater than the height of the tank itself.

A known plant cultivation system is described, for example, in CN 109 699 488 A.

DISCLOSURE OF INVENTION

The Applicant has therefore conducted an in-depth study with the purpose of identifying a solution that is simple and economical to implement, which is able to overcome the above-mentioned technical problems.

This purpose is achieved by the present invention as it relates to a cultivation system, as disclosed in the corresponding appended claims.

This purpose is also achieved by the present invention as it relates to an operation method for a cultivation system, as defined in the appended claims.

BRIEF DESCRIPTION OF THE DRAWINGS

This invention will now be described with reference to the accompanying drawings, which illustrate a non-limiting embodiment thereof, wherein.

BEST MODE FOR CARRYING OUT THE INVENTION

The present invention will now be described in detail with reference to the accompanying drawings in order to allow a person skilled in the art to implement and use it. Various modifications to the described embodiments will be readily apparent to persons skilled in the art and the general principles described may be applied to other embodiments and applications without, however, departing from the protective scope of this invention, as defined in the appended claims. Accordingly, this invention is not to be limited in scope to the embodiments described and illustrated herein, but is to be accorded the widest scope consistent with the principles and characteristics disclosed and claimed herein.

The present invention is essentially based on the idea of positioning, in each cultivation plane, at least one suction duct at the nebulizing devices present in the cultivation plane so as to suck up the liquid that, during spraying, is dispersed by the nebulizing devices. The present invention is also based on the idea of positioning a liquid collection basin below the cultivation plane so as to collect the liquid dispersed during the spraying and to use the suction duct inside the basin to empty it.

Figure 1:
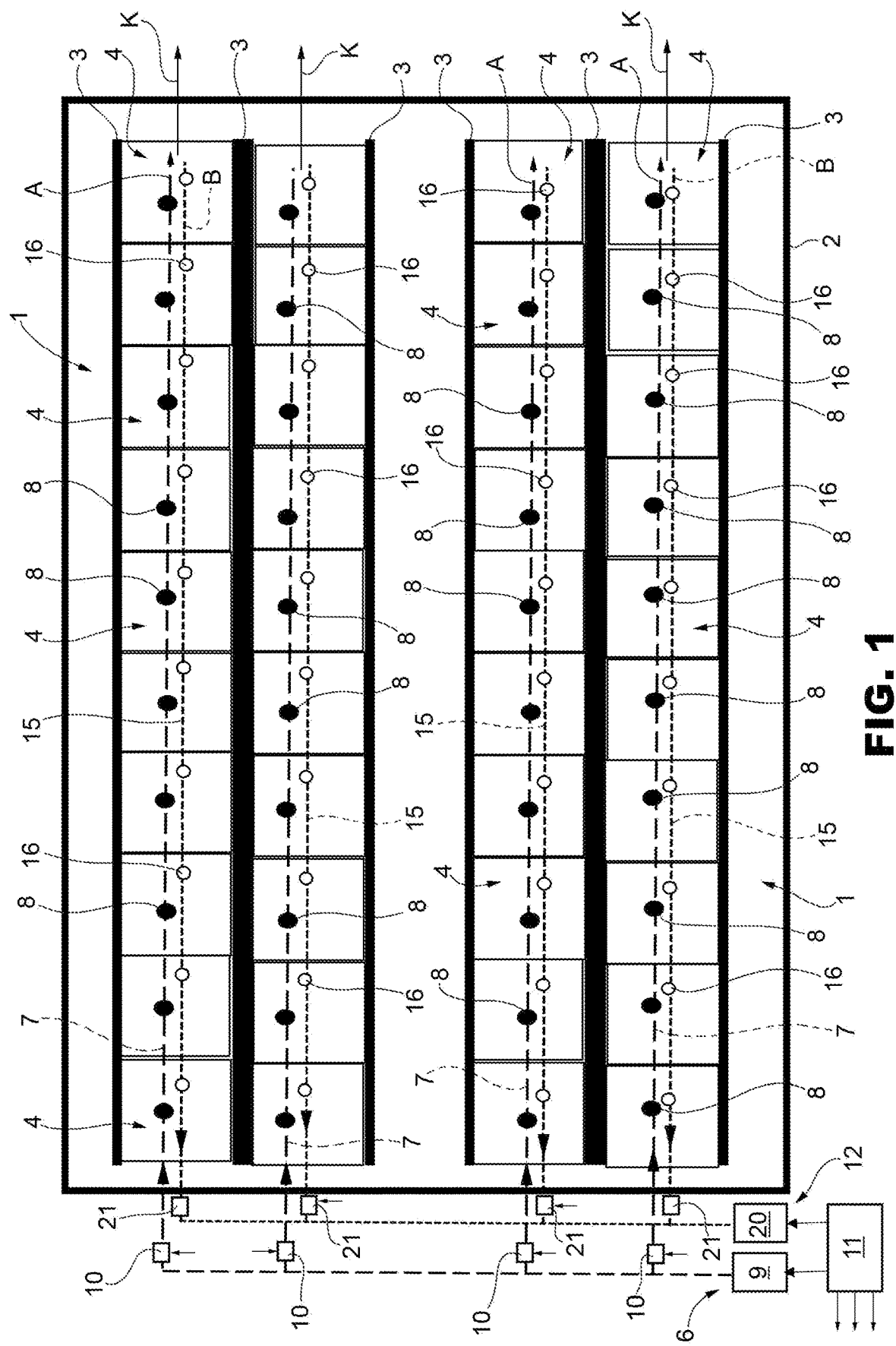
FIG. 1 schematically shows a cultivation system for the production of plants constructed according to the precepts of the present invention.
Figure 2:
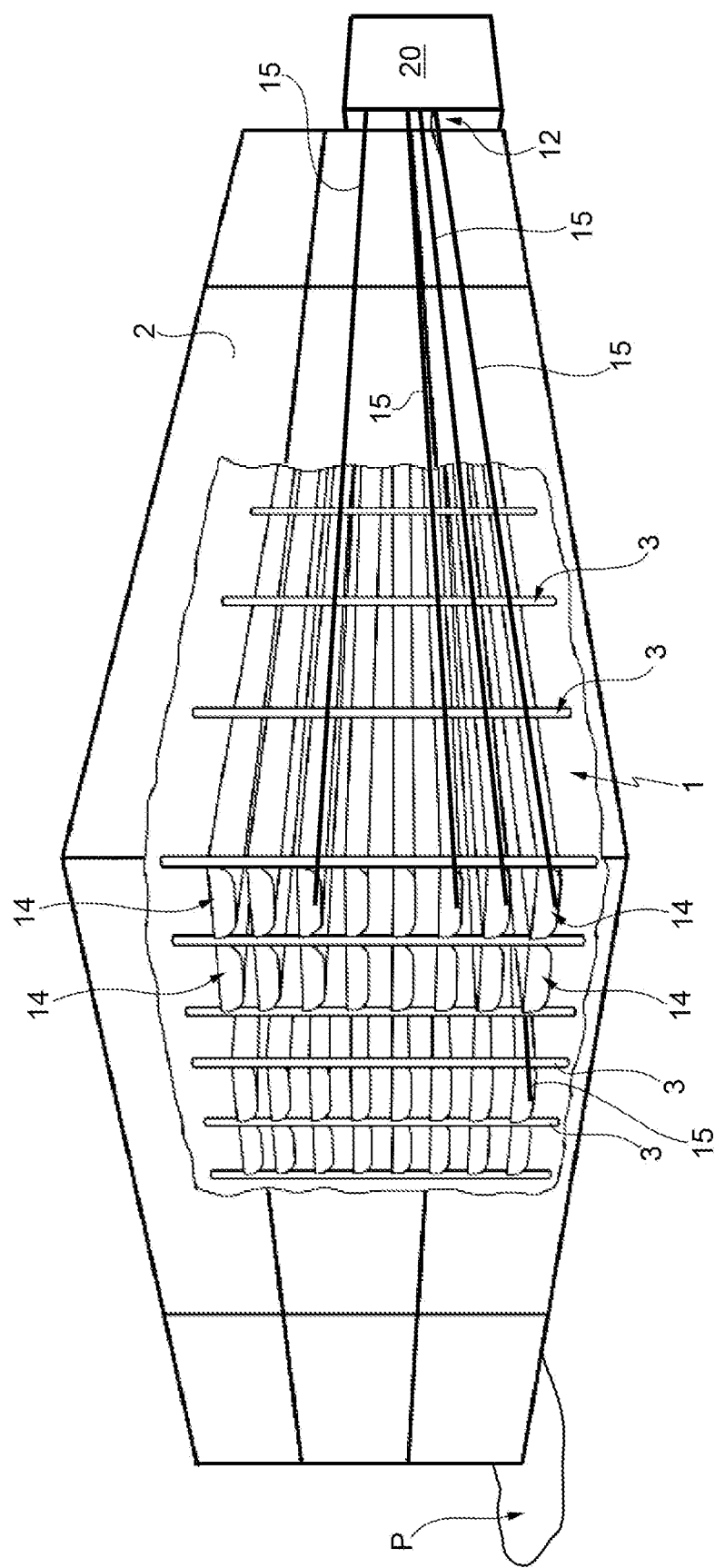
FIG. 2 is a perspective view with parts removed for clarity of a preferred embodiment of the cultivation system for the production of plants constructed according to the precepts of the present invention.
Figure 3:
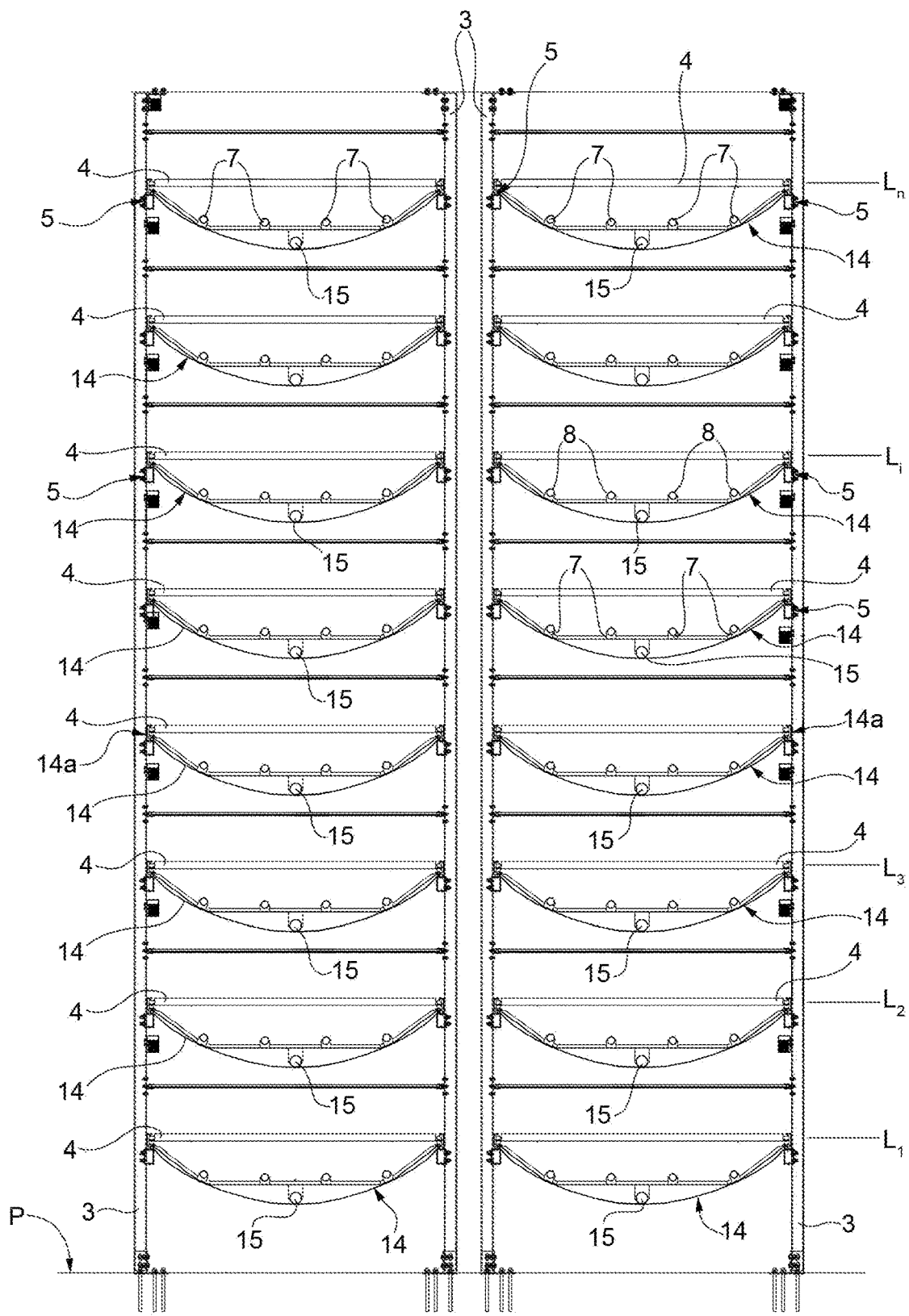
FIG. 3 is a vertical cross-section of a portion of the cultivation system for the production of plants shown in FIG. 2.

According to an embodiment schematically shown in FIGS. 1, 2, and 3, the number 1 schematically denotes, as a whole, a cultivation system for plants. Preferably, but not necessarily, the cultivation system 1 may be of the multi-plane, vertical-farm type (FIGS. 2 and 3).

The cultivation system 1 may be arranged inside a greenhouse container 2, preferably a closed one. The greenhouse container 2 may internally delimit the cultivation environment in which at least one cultivation system 1 is installed (in FIG. 1 two cultivation systems 1 are illustrated merely by way of non-limiting example). The greenhouse container 2 may comprise at least one pavilion-shaped, closed space formed from walls made of transparent material, based on glass and/or plastic, so as to illuminate the cultivation system 1 via solar radiation.

It is understood that the greenhouse container 2 is not limited to the container with transparent walls of the type described above, but may comprise a container formed from walls of non-transparent material. In an embodiment wherein the cultivation system 1 is of the vertical-farm type, the greenhouse container has walls made of non-transparent material.

It is also implied that, in the discussion that follows, the term "plant" refers to any vegetal product, preferably for food use. The plants may comprise lettuces, greens, vegetables, and aromatic herbs, such as rocket, basil, mint, and the like. It is, in any case, implied that the above-mentioned invention is not limited to plants for food use of the type listed above, but may also be applied to cultivate other types of plants, generally cultivated in greenhouses of the conventional kind, such as flowers, plants, and the like.

In the following discussion, explicit reference will be made to vertical-farm cultivation systems 1 without any loss of generality thereby.

With reference to the embodiment shown in FIGS. 1 and 2, the greenhouse container 2 is closed and may have, for example, a conveniently parallelepiped shape that internally delimits a space/environment for cultivation, preferably artificial. It is implied that the term "artificial cultivation environment" refers to an earthless or above-ground production area/space (grow area), inside of which the automatic plant cultivation/growth programme is carried out. In the artificial cultivation environment, artificial lighting devices (not illustrated), such as LED devices or the like, may be provided inside the greenhouse container 2. Since these are of a known type, they will not be described further.

The cultivation system 1 comprises one or more frames 3 arranged resting on a horizontal plane P (FIG. 3), and a series of cultivation shelves 4 mounted on the frames 3, so as to form one or more cultivation planes Li, preferably horizontal (which vary between 1 and n layers) and overlapping each other at corresponding, increasing heights from the plane P.

Figure 4:
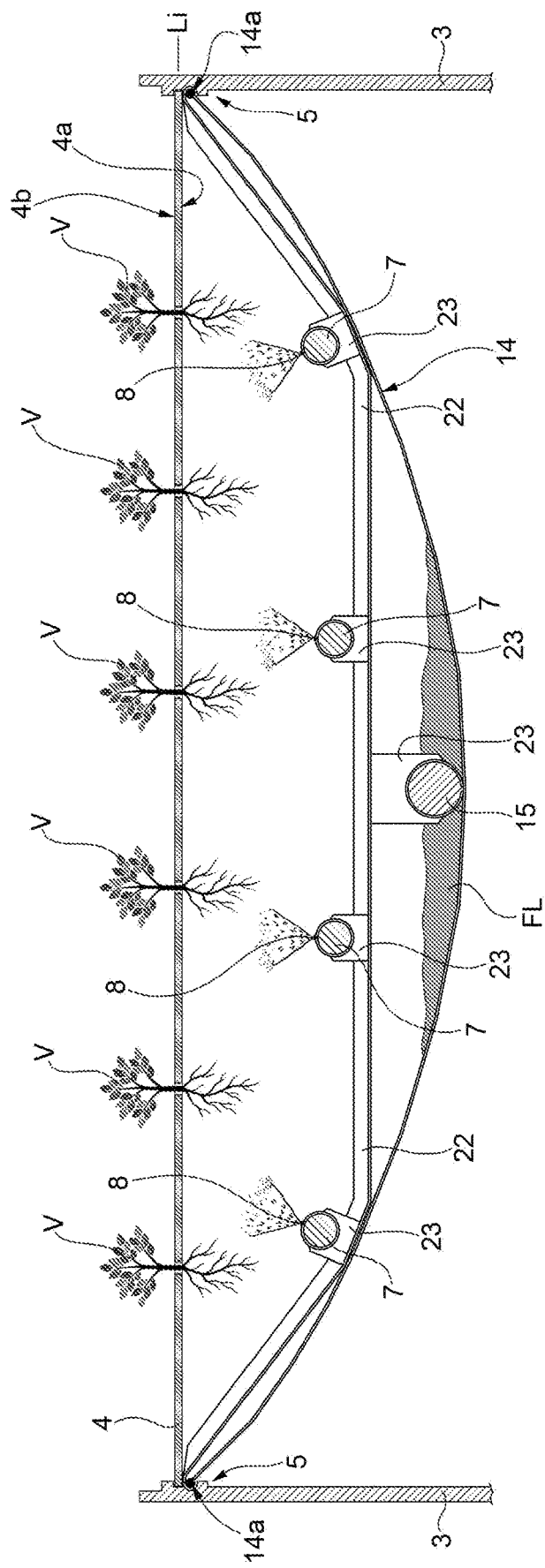
FIG. 4 is a vertical cross-section of a cultivation plane of the cultivation system for the production of plants, constructed according to the precepts of the present invention.
Figure 5:
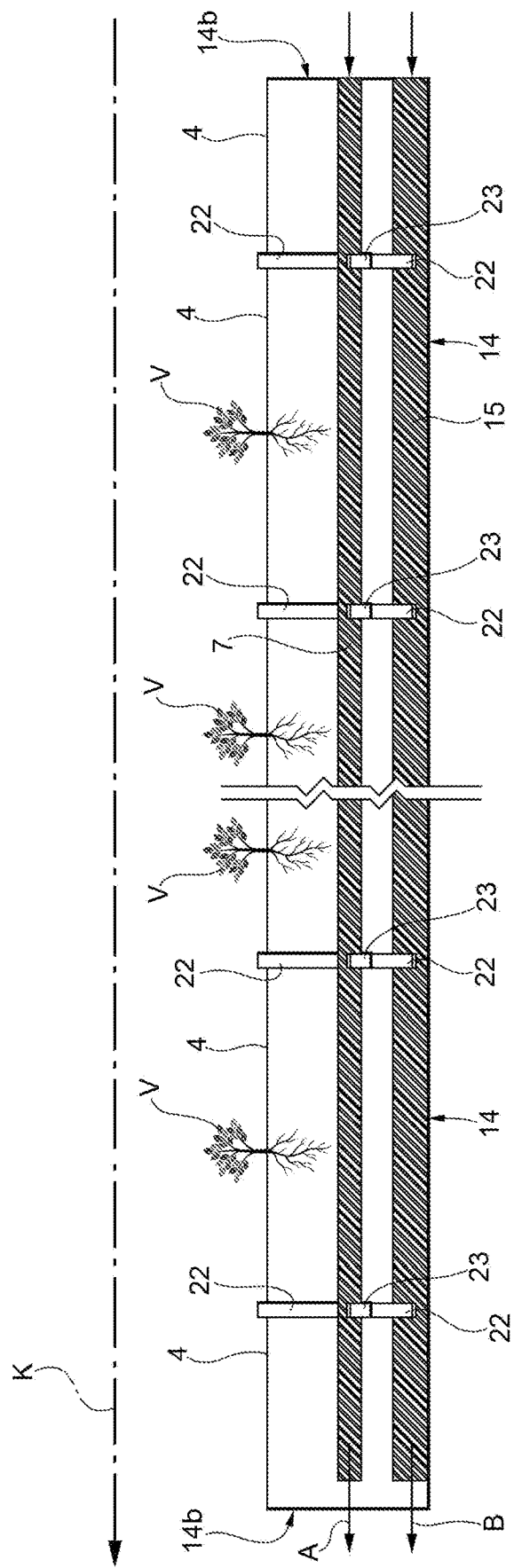
FIG. 5 is a vertical longitudinal section of a portion of the cultivation plane of the cultivation system for the production of plants, constructed according to the precepts of the present invention.

With reference to FIG. 5, the cultivation shelves 4, which form a shared cultivation plane/level Li, are coplanar to each other and are arranged one alongside the other along an extension direction K, with the relative, adjacent sides next to each other. The cultivation shelves 4 are structured to support the plants during growth (indicated with V in FIGS. 4 and 5), can preferably have an approximately rectangular shape, and can have the same dimensions. The cultivation shelves 4 may be structured so as to be firmly coupled to the frame 3 but also so that they can be easily removed/detached (or separated). According to one embodiment shown in FIGS. 1, 4, and 5, the cultivation shelves 4 comprise thin, flat sheets that are arranged approximately horizontally with the opposite, straight longitudinal edges (parallel to the direction K) resting on respective lateral, support clamps 5 preferably mounted on the vertical columns of the frame 3 (FIG. 4). The cultivation shelves 4 are preferably made, for example, from a plastic base, and are structured to ensure that the plant roots, during the plants' growth, firmly grasp the body of the cultivation shelf 4 so that the roots extend mainly below the lower surface 4a of the cultivation shelf 4, and the useful plant portion mainly extends above the upper surface 4b of the cultivation shelf 4.

With reference to FIG. 1, the cultivation system 1 comprises, in addition, an aeroponic feeding system 6, which is structured so as to selectively nebulise a liquid at the cultivation shelves 4 present in the cultivation planes Li. It is understood that the liquid may be based on a mix of water and nutritional substances suitable for plants (fertilisers). The aeroponic feeding system 6 may be structured to selectively feed the liquid in the cultivation planes Li in a controlled way in terms of quantity and/or type and/or instants of feeding, via spraying. According to one embodiment shown in FIG. 1, the aeroponic feeding system 6 may comprise, for each cultivation level/plane Li, at least one delivery tube or duct 7 through which the liquid circulates, and a series of nebulizing devices, for example nozzles 8, which are preferably arranged below the cultivation shelves 4 of the cultivation plane Li so as to spray the liquid towards the lower surface 4a of the cultivation shelves 4 above and are hydraulically connected to the delivery duct 7 to receive the liquid.

According to the embodiment shown in the attached figures, the aeroponic feeding system 6 may comprise, for each cultivation plane Li, at least one delivery duct 7 that is arranged below the cultivation shelves 4 and extends along the cultivation plane Li, parallel to the extension direction K of the cultivation plane Li itself (FIGS. 1 and 5). According to a preferred embodiment shown in FIGS. 3-7, the aeroponic feeding system 6 may comprise four delivery ducts 7, while the nozzles 8 are arranged above the delivery ducts 7, preferably supported by the same. The delivery ducts 7 are, preferably, basically straight, having axes A that are parallel to each other and to the direction K, and are conveniently coplanar and equidistant to each other (FIG. 4).

According to the embodiment shown in FIG. 1, the aeroponic feeding system 6 comprises, in addition, a feeding assembly 9, which is designed to selectively supply the feeding ducts 7 with the liquid to feed the cultivation shelves 4. The feeding assembly 9 is of a known type and, therefore, will not be additionally described if not to specify that it may comprise liquid containment basins (not illustrated) and hydraulic pumps (not illustrated) that suck up liquid from the basins and supply it at the inlet to the ducts 7. The aeroponic feeding system 6 may also comprise, preferably but not necessarily, solenoid valves 10 that are connected to the ducts 7 and are designed to selectively open/close each relative duct 7 based on a corresponding command/signal generated by an electronic control unit 11.

The cultivation system 1 also comprises a suction system 12 that is structured so as to suck up the dispersed nebulised liquid in each of the cultivation planes Li. According to a preferred embodiment shown in FIGS. 3, 4, and 5, the suction system 12 comprises, for each cultivation plane Li, a liquid collection basin 14, which is arranged immediately below the cultivation shelves 4 that form the cultivation plane Li and is structured to collect and contain the liquid that falls during spraying performed on the cultivation plane Li itself (FIGS. 1, 3, 4, and 5).

The suction system 12 also comprises, for each cultivation plane Li, at least one suction duct 15, which is arranged below the cultivation plane Li so as to be inside the liquid collection basin 14 and extends along a longitudinal axis B approximately parallel to the extension direction K and to the axis A (FIG. 5). The Applicant has found that the use of the suction duct 15 inside each liquid collection basin 14 makes it possible to quickly empty each basin in a selective way, independently of the other planes and independently of the length of the plane itself. In addition, the synergistic use of the liquid collection basin and of the suction duct in the same, makes it possible to size the length of the system as desired, eliminating, in this way, any limits to the maximum dimensions of the same.

According to a preferred embodiment shown in FIGS. 1-7, the suction system 12 comprises a suction duct 15 that preferably extends for the whole length of the corresponding cultivation plane Li.

Figure 7:
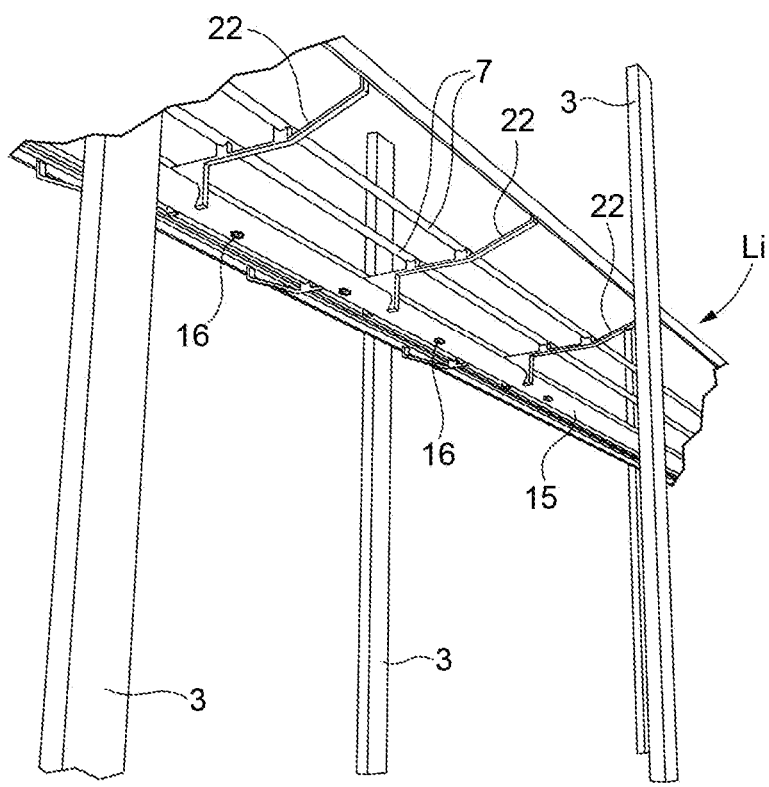
FIG. 7 is a perspective view from below with parts removed for clarity of a cultivation plane of the cultivation system for the production of plants, constructed according to the precepts of the present invention.

According to one embodiment shown in FIG. 7, the suction duct 15 has suction through-openings 16 through which the liquid contained in the liquid collection basin 14 is sucked upon into the suction duct 15. The suction through-openings 16 may be made in the suction duct 15 according to a longitudinal distribution so as to be able to recuperate the liquid (indicated with FL in FIG. 4) in the liquid collection basin 14 for the whole length of the same. For example, the suction through-openings 16 may be made below on the side of the suction duct 15 facing/adjacent to the bottom of the liquid collection basin 14 and/or laterally to the same. The suction through-openings 16 may, preferably, be circular and be approximately 6 mm in diameter.

According to a preferred embodiment, the liquid collection basin 14 extends below the cultivation shelves 4 of a cultivation plane Li for the whole length of the same (along the direction K). The liquid collection basin 14 preferably comprises a thin layer in waterproof material that is very flexible. The Applicant found it convenient to use a film of waterproof fabric. For example, the Applicant found it convenient to use a flexible sheet based on plastic material (PVC) since it is extremely simple to mount and is economic. Laboratory tests performed by the Applicant found it was convenient to use, for example, a flexible, waterproof sheet called POLYPLAN Tent Opaque® marketed by SATTLER®.

The layer is preferably made of material that is not transparent to light, so as to prevent it from illuminating the plants' roots.

However, it remains understood that this invention is not limited to a layer of very flexible waterproof material. For example, according to one embodiment (not illustrated), the layer could be based on stiff material. For example, according to one embodiment (not illustrated), the layer could be based on metal or plastic material. For example, according to one embodiment (not illustrated), the liquid collection basin could comprise a stiff recipient or container, obtained, for example, through moulding, open above that extends below the cultivation shelf 4.

The liquid collection basin 14 is preferably, approximately, horizontal. With reference to the embodiment shown in FIGS. 4 and 6, the liquid collection basin 14 has two larger sides 14a that extend parallel to the direction K and are coupled to the vertical columns of the frame 3 at the longitudinal sides of the cultivation shelves 4. The two edges of the layer that form the two larger sides 14a laterally delimit the bottom wall of the liquid collection basin 14. The larger sides 14a can, preferably, be coupled to the frame 3 via opposite, lateral retention guides, which are fixed to the frame 3 and inside of which the two larger sides 14a of the liquid collection basin 14 are inserted by sliding. In the embodiment shown in FIG. 4 wherein the liquid collection basin 14 comprises the layer, the larger sides 14a may be enlarged, i.e. comprise a cross section that is preferably circular and has a diameter that is greater than the thickness of the layer, while the guides may have a cross section that approximates (upwards) the diameter of the two larger sides 14a.

In the embodiment shown in FIGS. 3 and 4, the bottom wall of the liquid collection basin 14 has a cross section in the direction K approximately arched or semi-circular. With reference to FIG. 5, the liquid collection basin 14 has, in addition, on the two opposite longitudinal ends, two containment walls 14b that are transverse to the direction K. The two containment walls 14b close the two openings present at the ends of the bottom wall so as to form the liquid collection recipient. The two containment walls 14b extend approximately vertically and are designed to form the two smaller sides of the basin. The two walls 14b are preferably constructed via the same layer of the bottom wall of the liquid collection basin 14 and are joined (for example welded along the corresponding edges) to the latter so as to form a single body capable of containing the liquid.

The larger sides 14a that form the upper edges of the bottom wall and, preferably, the lower edges of the two walls 14b are, preferably, approximately coplanar (horizontally) and are basically arranged close to the, resting on the lower surface 4a of the cultivation shelves 4 at, approximately, the outer sides of the latter, so as to prevent, on the one hand, the nebulised liquid from coming out of the frame 3 and to facilitate, on the other, its collection in the basin 14.

With reference to FIGS. 4, 5, 6, and 7, according to a possible embodiment, the suction duct 15 extends straight centrally for the whole length of the cultivation shelf 4 and is arranged at the, adjacent to the, portion mainly below the liquid collection basin 14 so as to be able to empty it completely.

With reference to the embodiment shown in FIG. 1, the suction system 12 may comprise, in addition, a suction assembly 20 that is hydraulically connected to the suction ducts 15 to suck up, selectively, the liquid contained in the liquid collection basin 14. The suction assembly 20 may preferably comprise hydraulic suction pumps (not illustrated), recovery basins (not illustrated), filters (not illustrated), and solenoid valves 21. The solenoid valves 21 can preferably be arranged along the suction ducts 15 and are designed to close/open them on the basis of the respective commands/signals supplied by the electronic control unit 11. The suction pumps can be selectively driven by the electronic control unit 11 based on a pre-set suction programme. Electrical/electronic liquid detection sensors may be provided in the liquid collection basins 14 (not illustrated). The operation of sucking up the liquid contained in each liquid collection basin 14 can be controlled based on the detection of the electrical/electronic liquid detection sensors (not illustrated) present in the liquid collection basins 14 themselves.

Figure 6:
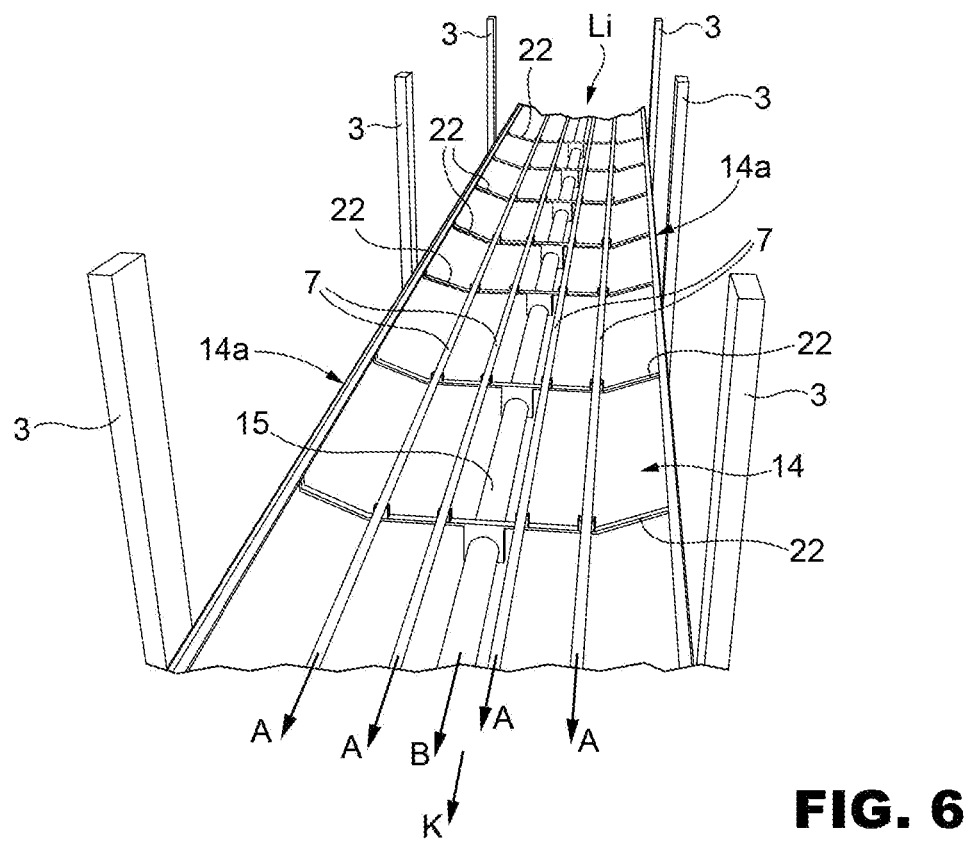
FIG. 6 is a perspective view from above with parts removed for clarity of a cultivation plane of the cultivation system for the production of plants, constructed according to the precepts of the present invention.

According to one embodiment shown in FIGS. 6 and 7, the delivery ducts 7 and the suction duct 15 can be supported inside the liquid collection basin 14, via the support rods 22 that extend transverse to the extension direction K, below the cultivation shelves 4, and are rigidly fixed to the upper ends on the vertical columns of the frame 3. The support rods may be equidistant from each other along the direction K.

The support rods 22 can preferably be basically arched, so as to approximately follow the inner surface of the bottom wall of the liquid collection basin 14 and are provided with snap fastening elements, for example tube-holder devices 23, in which the delivery ducts 7 and the suction duct 15 are inserted. The support rods 22 can preferably keep the layer of the liquid collection basin 14 taut towards the outside. The support rods 22 preferably support the suction duct 15 below the delivery ducts 7 and approximately close to the bottom of the basin 14.

The operation method for the cultivation system 1 can be easily deduced from the above and will not be described further except to specify that it essentially comprises the steps of: collecting the dispersed nebulised liquid in the liquid collection basin 14 arranged immediately below the support shelves 4 of the cultivation plane Li, and sucking up the liquid contained in the liquid collection basin 14 through the suction duct 15 that extends inside the liquid collection basin 14 along the longitudinal axis B parallel to said direction K.

The cultivation system described above is advantageous in that it eliminates clogging conditions and therefore ensures that the cultivation environment is very clean, with all the advantages this entails in terms of reducing the risk of contamination caused by stagnation of the dispersed liquid.

The cultivation system also eliminates the need to place a common collection basin below the first cultivation plane, to collect the liquid that drains by gravity from the upper basins and therefore allows the minimum height of the first cultivation plane to be reduced, thus optimising the space that is occupied by the basins themselves in the prior art.

Lastly, it is clear that modifications and variants may be made to the cultivation system and method described and illustrated herein while remaining within the scope of the present invention defined by the appended claims.

The invention claimed is:

1. A system for cultivating plants comprising:

a plurality of cultivation shelves for cultivating plants, support frames structured to support said cultivation shelves to form one or more horizontal cultivation planes each of which extends along a first horizontal direction, the cultivation shelves are coplanar to each other in order to form respective shared cultivation planes, the cultivation shelves forming said cultivating planes are arranged end-to-end-along the first horizontal direction, with the relative, adjacent sides next to each other, an aeroponic feeding system, which is provided with nebulising devices which are arranged below said cultivation shelves for spraying the liquid towards the cultivation shelves themselves, said cultivation system comprises a suction system that is arranged at said nebulising devices for sucking-up the nebulised liquid dispersed by the nebulising-devices, said cultivation system being characterized in that:

said suction system comprises for each cultivation plane:

a liquid collection basin common to the cultivation shelves of said cultivation plane, which is arranged immediately below the cultivation shelves that form said cultivation plane so as to extend along a direction approximately parallel to said first horizontal direction and is structured to collect and contain said dispersed nebulised liquid that falls during spraying performed on the cultivation plane, and a suction duct that is arranged below the cultivation shelves of said cultivation plane and extends along the cultivation plane, parallel to the first direction, said suction duct extends inside said liquid collection basin and is designed to suck-up the liquid contained within the liquid collection basin in order to empty said collection basin in a selective way, independently of the other cultivating planes, said suction duct is arranged adjacent to the bottom wall of said liquid collection basin and extends for the entire length of the of the cultivation plane along said first direction, wherein on said suction duct suction through-openings are present, spaced from one another along a longitudinal axis of said suction duct.

2. The cultivation system according to claim 1, wherein said liquid collection basin comprises a thin layer made of flexible waterproof material.

3. The cultivation system according to claim 2, wherein said layer is made of material that is not transparent to light in order to prevent it from illuminating the roots of the vegetables.

4. The cultivation system according to claim 1, wherein the liquid collection basin comprises a flexible sheet made of plastic material.

5. The cultivation system according to claim 1, wherein said suction duct extends along a longitudinal axis parallel to said first direction, approximately central to said liquid collection basin.

6. The cultivation system according to claim 1, wherein said suction through-openings are made in the suction duct, on the side of the suction duct adjacent to the bottom of the liquid collection basin.

7. The cultivation system according to according to claim 1, wherein said suction through-openings are circular and are approximately 6 mm in diameter.

8. The cultivation system according to claim 1, wherein said aeroponic feeding system comprises at least one delivery duct for the liquid, which extends inside the liquid collection basin along a relative longitudinal axis parallel to said first direction, and a series of nebulising devices that are connected to said delivery duct and are arranged inside the liquid collection basin for spraying the liquid towards said cultivation shelves.

9. The cultivation system according to claim 8, wherein said delivery ducts and said suction duct are supported inside the corresponding liquid collection basin via support rods that extend transverse to said first direction, below the cultivation shelves and are rigidly fixed with the upper ends on vertical columns of said frame.

10. The cultivation system according to claim 9, wherein said support rods are arched so as to follow the internal surface of the bottom wall of the liquid collection basin.

11. The cultivation system according to claim 10, wherein said support rods are provided with snap fastening elements in which the delivery ducts and the suction duct are inserted.

12. The cultivation system according to claim 10, wherein said support rods support said suction duct below the delivery ducts and approximately close to the bottom of the liquid collection basin.

13. The cultivation system according to claim 9, wherein said support rods are designed to keep the layer of the liquid collection basin stretched towards the outside.

14. The cultivation system according to claim 1, wherein said liquid collection basin has two opposite longitudinal sides that are parallel to said first direction and are arranged close to the longitudinal sides of the cultivation shelves of a relative cultivation plane.

15. The cultivation system according to claim 14, wherein said longitudinal sides are coupled to the frame via opposite, lateral retention guides, which are fixed to the frame and inside of which two longitudinal sides of the liquid collection basin are inserted by sliding.

16. The cultivation system according to claim 14, wherein said longitudinal sides that form the upper edges of the bottom wall are coplanar to each other and are arranged resting on the lower surface of said cultivation shelves, approximately at the outer sides of the latter so as to prevent the nebulised liquid from coming out of the frame and for collecting the same in said basin.

17. The cultivation system according to claim 1, comprising a suction assembly that is hydraulically connected to a series of suction ducts joined to corresponding liquid collection basins to selectively suck the liquid contained in the liquid collection basins themselves.

18. A method for operating a system for cultivating plants wherein the system comprises a plurality of support shelves for cultivating plants, support frames structured to support said cultivation shelves so as to form one or more horizontal cultivation levels which develop along a first horizontal direction, the cultivation shelves are coplanar to each other in order to form respective shared cultivation planes, the cultivation shelves forming each said cultivating plane are arranged end-to-end along the first horizontal direction, with the relative, adjacent sides next to each other,
- an aeroponic feeding system, which is structured so as to selectively provide a nebulised liquid towards said support shelves of said cultivation planes,
- said method being characterised in that it comprises the step of:
- collecting from the support shelves of each cultivation plane the dispersed nebulised liquid through a liquid collection basin common to the cultivation shelves of said cultivation plane and that is arranged immediately below the cultivation shelves of said cultivation plane and extends an entire length of the cultivation plane, wherein said liquid collection basin extends along a direction parallel to said first horizontal direction,
- and sucking-up the liquid contained in the liquid collection basin in order to empty said collection basin in a selective way, independently of the other cultivating planes, through a suction duct which extends inside said liquid collection basin along a longitudinal axis parallel to said first direction along the whole length of the same along said first direction, and is arranged approximately adjacent to the bottom wall of said liquid collection basin,
- wherein on said suction duct suction through-openings are present, spaced from one another along a longitudinal axis.

* * * * *